Patented Mar. 5, 1935

1,993,555

UNITED STATES PATENT OFFICE 1,993,555

PRODUCTION OF ALIPHATIC CARBOXYLIC ACIDS

Alfred T. Larson, Wilmington, Del., assignor to E. I. du Pont de Nemours & Company, Wilmington, Del., a corporation of Delaware No Drawing. Application November 15, 1932, Serial No. 642,765

13 Claims. (Cl. 260—112)

This invention relates to the synthesis of organic compounds and particularly to the preparation of higher aliphatic acids by the interaction of halogenated hydrocarbons, carbon monoxide, and steam.

An object of the present invention is to provide a process for the preparation of aliphatic carboxylic acids from steam, carbon monoxide, and the halogenated hydrocarbons. A further object of this invention is to provide a process for the preparation of monocarboxylic acids from steam, carbon monoxide and halogenated hydrocarbons in the presence of an absorbent material such as pumice, silica gel, active carbon, etc. Another object of the invention is to provide a process for the preparation of acids having the structural formula—

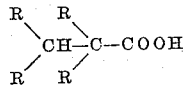

from steam, carbon monoxide, and a halogen substituted hydrocarbon, the R indicating hydrogen or a substituted or unsubstituted similar or dissimilar alkyl or aralkyl grouping. Other objects and advantages will hereinafter appear.

In accord with this invention aliphatic carboxylic acids can be prepared from steam, carbon monoxide, and a halogenated hydrocarbon by passing these constituents, under suitable pressure and temperature conditions, over an absorbent material such as pumice, silica gel, but preferably over active carbon, and especially over activated charcoal. The products resulting from such a reaction will contain generally a mixture of aliphatic carboxylic acids some of which have a greater, some a lesser, number of carbon atoms than are present in the hydrocarbon treated, an aliphatic acid containing one more carbon atom than the hydrocarbon, usually predominating.

Usually the presence of activated charcoal or some other form of active carbon is sufficient to effect a good conversion of the halogenated hydrocarbon to the acid. Under some circumstances, however, it may be found necessary in order to further the reaction to have another catalyst present. A number of catalysts may be used for this purpose and those which have been found particularly efficient for effecting the formation of acids from alcohols and carbon monoxide are recommended, and particularly the halogens and volatile halides, such as chlorine, bromine, hydrogen chloride, hydrogen bromide, etc. with or without the presence of a metal halide with which the charcoal may be saturated prior to the reaction. In many instances by impregnating the charcoal with phosphoric, sulphuric, arsenic, and like acids a good conversion is effected; these latter catalysts may likewise be used in conjunction with a volatile halide.

In lieu of using the halogenated hydrocarbon per se a halogen and the proper hydrocarbon may be used. For example, when acetic acid is to be prepared the reaction would be effected by interacting methane, chlorine, carbon monoxide and steam in the presence of activated charcoal. If a higher acid is to be prepared the higher hydrocarbon, of course, should be employed. When effecting the reaction in this manner a slight excess of the halogen over that required to react with the hydrocarbon to form the halogenated hydrocarbon should be used, and in some instances the use of activating light rays, such as ultra-violet, will be found advantageous in initiating the reaction.

The halogenated hydrocarbons which are suitable for reacting with the carbon monoxide and steam to form the acid include the mono- and poly-substituted hydrocarbons. The halogen substituent thereof is preferably chlorine, altho the other halogens, bromine, chlorine and iodine, may likewise be used. Hydrocarbons containing a primary, secondary, or tertiary carbon atom, and for that matter, even those hydrocarbons which are fully saturated with a halogen such as carbon tetrachloride, may be employed, although I prefer to use the mono-substituted derivatives of the hydrocarbon. Examples of the above halogenated derivatives include such compounds as methyl chloride, ethyl chloride, normal and isopropyl chlorides, 2-chloro-propane, 1- and/or 2-chloro-butane, 2-methyl-3-chloro-propane, 2-methyl-2-chloro-propane, methylene chloride, acetylene chloride, propylene chloride, chloroform, glyceryl chloride, 1:2:3-trichloropropane, perchloroethane, and equivalent homologous halogenated hydrocarbons. As indicated above, the halogenated substituent of the above cited compounds may contain as well the other members of the elements of the halogen group rather than the chlorine indicated.

Raw materials suitable for use in the process are readily available from a number of sources. Thus, the carbon monoxide required for the synthesis may easily be derived from various commercial sources, such as, for example, water gas, producer gas, carbide formation, etc., by liquefaction or other methods, and should be likewise for the best results relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied, although it has been found that very advantageous results are obtained when the steam and carbon monoxide are in excess with respect to the halogenated hydrocarbon. Concentrations of the latter within the range of from 1½ to 10% by volume of the total reactants have been employed with good results.

The use of pressures in excess of atmospheric, say from 25–900 atmospheres, is preferred. The reaction proceeds over a wide range of temperatures, altho the optimum temperature varies with specific cases, depending inter alia upon the hydrocarbon being used. Generally the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate methods of practising the invention, altho the invention is not limited to the examples.

*Example 1.*—A gaseous mixture is prepared containing by volume 95% carbon monoxide, and 5% isopropyl chloride, together with steam to give a steam: carbon monoxide and isopropyl chloride ratio of approximately 0.25. The resulting gaseous mixture is passed into a conversion chamber designed for carrying out exothermic gaseous reactions and in which activated charcoal is disposed. The temperature of the reaction is maintained at approximately 325° C. while the pressure is held at approximately 700 atmospheres. A good yield of isobutyric acid is obtained together with other organic compounds.

*Example 2.*—A gaseous mixture is prepared containing by volume 95% carbon monoxide and 5% ethyl chloride, together with steam, to give a steam: carbon monoxide and ethyl chloride ratio of approximately .25. This gaseous mixture is reacted under the same pressure and temperature conditions as given under Example 1, the gases likewise passing over activated charcoal. Propionic acid is obtained.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the method hereinbefore described without departing from the invention or sacrificing the advantages thereof.

I claim:

1. A process of producing aliphatic carboxylic acids which comprises reacting a halogenated aliphatic hydrocarbon and steam with carbon monoxide.

2. A process of producing aliphatic carboxylic acids which comprises reacting a halogenated aliphatic hydrocarbon and steam with carbon monoxide in the presence of a suitable absorbent material.

3. A process of producing aliphatic carboxylic acids which comprises reacting a halogenated aliphatic hydrocarbon and steam with carbon monoxide in the presence of active carbon.

4. The process which comprises reacting ethyl chloride, steam, and carbon monoxide and thereby producing propionic acid.

5. The process which comprises reacting propyl chloride, steam, and carbon monoxide, and thereby producing a butyric acid.

6. The process which comprises reacting a butyl chloride, steam, and carbon monoxide, and thereby producing a valeric acid.

7. The process which comprises reacting propyl chloride, steam, and carbon monoxide, in the presence of active carbon and thereby producing a butyric acid.

8. The process which comprises reacting a butyl chloride, steam, and carbon monoxide, in the presence of active carbon and thereby producing a valeric acid.

9. The process which comprises reacting ethyl chloride, steam, and carbon monoxide in the presence of active carbon and thereby producing propionic acid.

10. A process of reacting a halogenated aliphatic hydrocarbon, steam, and carbon monoxide for the purpose of producing an aliphatic carboxylic acid, characterized in that the reaction is effected under a pressure within the range of 25–900 atmospheres.

11. A process of reacting a halogenated aliphatic hydrocarbon, steam, and carbon monoxide for the purpose of producing an aliphatic carboxylic acid, characterized in that the reaction is effected at a temperature within the range of from 200–500° C.

12. A process of reacting a halogenated aliphatic hydrocarbon, steam, and carbon monoxide thereby producing an aliphatic carboxylic acid, characterized in that the reaction is effected in the presence of a volatile halide catalyst and a form of active carbon.

13. The process which comprises reacting a halogenated aliphatic hydrocarbon, steam, and carbon monoxide in the presence of a catalyst capable of promoting the synthesis of aliphatic acids from carbon monoxide and alcohols, and thereby producing an aliphatic carboxylic acid.

ALFRED T. LARSON.